US00RE38499E

(19) United States
(12) Reissued Patent
Merrill et al.

(10) Patent Number: US RE38,499 E
(45) Date of Reissued Patent: Apr. 20, 2004

(54) TWO-STAGE AMPLIFIER FOR ACTIVE PIXEL SENSOR CELL ARRAY FOR REDUCING FIXED PATTERN NOISE IN THE ARRAY OUTPUT

(75) Inventors: Richard B. Merrill, Woodside, CA (US); Kevin Brehmer, Morgan Hill, CA (US)

(73) Assignee: Foveon, Inc., Santa Clara, CA (US)

(21) Appl. No.: 09/896,920

(22) Filed: Jun. 29, 2001

(Under 37 CFR 1.47)

Related U.S. Patent Documents

Reissue of:
(64) Patent No.: 5,917,547
Issued: Jun. 29, 1999
Appl. No.: 08/897,781
Filed: Jul. 21, 1997

(51) Int. Cl.[7] ..... H04N 3/14; H04N 5/335; H04N 5/217; H01L 27/00; H03H 11/16

(52) U.S. Cl. ..... 348/301; 348/241; 348/308; 348/294; 348/300; 348/301; 348/302; 348/307; 348/309; 348/310; 348/295; 250/208.1; 327/247; 327/280; 327/287

(58) Field of Search ..... 348/294, 295, 348/300, 302, 301, 307, 308, 309, 310, 241; 250/208.1; 327/247, 280, 287

(56) References Cited

U.S. PATENT DOCUMENTS

| | | | | | |
|---|---|---|---|---|---|
| 4,900,943 | A | * | 2/1990 | Marshall et al. | 250/578.1 |
| 5,081,536 | A | * | 1/1992 | Tandon et al. | 348/241 |
| 5,233,180 | A | * | 8/1993 | Tsuruta et al. | 250/208.1 |
| 5,382,977 | A | * | 1/1995 | Kozlowski et al. | 348/216 |
| 5,488,415 | A | * | 1/1996 | Uno | 348/241 |
| 5,572,074 | A | * | 11/1996 | Standley | 250/200 |
| 5,587,738 | A | * | 12/1996 | Shinohara | 348/301 |

(List continued on next page.)

OTHER PUBLICATIONS

Funatsu et al.; "An Artificial Retina Chip with Current–Mode Focal Plane Image Processing Functions", IEEE Transactions on Electron Devices, vol. 44, No. 10, Oct. 1997.*

Nixon et al.; "256 CMOS Active Pixel Sensor Camera–on–a–Chip"; IEEE International Solid–State Circuits Conference; Session 11, paper FA 11.1 (1996).*

"256X256 CMOS Active Pixel Sensor Camera–on–a–Chip" Nixon et al. 1996 1EEE International Solid–State Circuits Conference/Paper FA 11.1, pp. 178–179.

*Primary Examiner*—Wendy R. Garber
*Assistant Examiner*—John M. Villecco
(74) *Attorney, Agent, or Firm*—Sierra Patent Group, Ltd.

(57) ABSTRACT

An active pixel sensor cell array in which a two-stage amplifier amplifies the output of each cell. The two-stage amplifier design reduces fixed pattern noise in the image data generated by reading the array, by providing increased gain for the output of each cell without impractically increasing the size and complexity of each cell. For each column of cells of the array, one part of the two-stage amplifier for each cell is shared by all cells of the column, and another part of the two-stage amplifier for each cell is included within the cell itself. Preferably, each cell includes only NMOS transistors (no cell includes a PMOS transistor). In preferred embodiments, a differential amplifier within each cell is the primary stage of the cell's output amplifier, PMOS load circuitry including a secondary output amplifier stage is shared by all cells of the column, and the two amplifier stages for each cell together comprise an op amp. In some such preferred embodiments, the op amp is provided with capacitor feedback for increased gain. Another aspect of the invention is an active pixel sensor cell including a differential amplifier, and PMOS transistor load circuitry coupled to the cell. Preferably, the differential amplifier is the first stage of an op amp, and the remainder of the op amp, including optional capacitor feedback circuitry, is coupled to the cell but is not included within the cell.

25 Claims, 3 Drawing Sheets

U.S. PATENT DOCUMENTS 5,751,189 A * 5/1998 Shyu et al. ..... 330/51
5,793,239 A * 8/1998 Kovacs et al. ..... 307/130
5,831,258 A * 11/1998 Street ..... 250/208.1
5,923,369 A * 7/1999 Merrill et al. ..... 348/301
5,962,844 A * 10/1999 Merrill et al. ..... 250/208.1
6,084,229 A * 7/2000 Pace et al. ..... 250/208.1
6,130,423 A * 10/2000 Brehmer et al. ..... 250/208.1
6,133,773 A * 10/2000 Garlepp et al. ..... 327/231
2002/0011554 A1 * 1/2002 Brehmer et al. ..... 250/208.1

* cited by examiner

TWO-STAGE AMPLIFIER FOR ACTIVE PIXEL SENSOR CELL ARRAY FOR REDUCING FIXED PATTERN NOISE IN THE ARRAY OUTPUT

Matter enclosed in heavy brackets [ ] appears in the original patent but forms no part of this reissue specification; matter printed in italics indicates the additions made by reissue.

FIELD OF THE INVENTION

The present invention pertains to an output amplifier for an active pixel sensor cell array. More particularly, the invention pertains to an output amplifier for an active pixel sensor cell array, the amplifier having a two-stage design that reduces fixed pattern noise in the image data output from the array.

DESCRIPTION OF THE RELATED ART

Charge-coupled devices (CCDs) have been the mainstay of conventional imaging circuits for converting photons incident at individual pixel sensor cells (of a pixel sensor cell array) into electrical signals indicative of the intensity of light energy incident at each cell. In general, a CCD uses a photogate to convert light energy incident at a cell into an electrical charge, and a series of electrodes to transfer the charge collected at the photogate to an output sense node.

Although CCDs have many strengths, including high sensitivity and fill-factor, CCDs also suffer from a number of weaknesses. These weaknesses include limited readout rates and dynamic range limitations, and notably, the difficulty in integrating CCDs with CMOS-based microprocessors.

To overcome the limitations of CCD-based imaging circuits, imaging circuits have been developed which use active pixel sensor cells to convert pixels of light energy into electrical signals. An active pixel sensor cell typically includes a conventional photodiode and a number of transistors which provide amplification, readout control, and reset control in addition to producing the electrical signal output from the cell.

FIG. 1 is an example of two identical CMOS active pixel sensor cells (10 and 11) having conventional design, connected along a column of an active pixel sensor cell array, and circuitry 21 for use in reading all cells connected along the column.

As shown in FIG. 1, cell 10 includes photodiode d1 (connected as shown between ground and Node 3), and reset transistor N1. Transistor N1 is an NMOS transistor whose drain is connected to a power supply node (Node 1) maintained at potential $V_{cc}$, whose source is connected to Node 3, and whose gate is connected to Node 2. The gate of transistor N1 is controlled (in a manner to be described below) by a RESET voltage supplied to Node 2.

Cell 10 also includes buffer transistor N2 and row select transistor N3, each of which is an NMOS transistor. Transistor N2 has a drain connected to Node 1, a source connected to Node 4, and a gate connected to Node 3. Transistor N3 has a drain connected to Node 4, a source connected to Node 6, and a gate connected to Node 5. The gate of transistor N3 is controlled (in a manner to be described below) by a ROW SELECT voltage supplied to Node 5.

As shown in FIG. 1, circuitry 20 includes detection and calculation circuit 21 whose input terminal is connected to Node 6. Circuit 21 includes a sense amplifier which outputs digital data indicative of light intensity incident at each selected cell along the column in response to voltages at Node 6 during a sampling period when each such cell is selected. Circuit 21 typically also implements correlated double sampling ("CDS") or another post-processing method on the digital data output from the sense amplifier.

In normal operation, circuit 21 receives a sequence of voltages at Node 6 (which node is common to all cells connected along the column), with each pair of consecutive voltages being indicative of light intensity incident (during a sampling period) at a different one of the cells along the column.

Circuitry 20 also includes NMOS transistor N6 (whose drain is connected to Node 6 and whose source is connected to ground) and a current mirror (comprising current source I1 and NMOS transistors N4 and N5 connected as shown) which provides the necessary load for reading out the cells. Transistor N5 of the current mirror preferably sinks no more than a small current (from Node 6 to ground), since fixed pattern noise resulting from mismatches in the channel lengths of the buffer transistors in the cells will increase with increasing current sunk by the current mirror.

The gate of transistor N6 (at Node 8) is controlled by a Column Reset signal. Use of a column reset transistor such as transistor N6 is described in U.S. patent application Ser. No. 08/871,519 entitled "Active Pixel Sensor Cell that Reduces Noise in the Photo Information Extracted from the Cell," filed on Jun. 9, 1997, naming Richard B. Merrill as inventor and assigned to the assignee of the present application.

Briefly, in operation of the FIG. 1 array, transistor N6 is used as a switch to place a defined voltage (ground potential) on Node 6 before circuit 21 reads one of the cells (e.g., cell 10). Preferably, the gate of transistor N6 is pulsed with a high level of column reset voltage "COLUMN RESET" prior to each pulsing of the row select voltage ROW SELECT. By pulsing the column select voltage COLUMN RESET just prior to each pulsing of the row select voltage ROW SELECT, the voltage at Node 6 is pulled to zero (ground potential) just prior to reading of the relevant one of the cells. When the voltage on Node 6 is set to zero immediately prior to pulsing the row select voltage, resulting noise (in the data determined by circuit 21) is reduced substantially. For example, in one implementation of FIG. 1, the noise is reduced from approximately 15 mV (in the case that N6 remains "off" at all times) to approximately one millivolt.

Also in accordance with the teaching of U.S. patent application Ser. No. 08/871,519 entitled "Active Pixel Sensor Cell that Reduces Noise in the Photo Information Extracted from the Cell," filed Jun. 9, 1997, switch transistor N6 is optionally replaced by a switch transistor whose channel terminals are connected between Node 6 and power supply Node 1, and whose gate is coupled to receive the column select voltage COLUMN RESET. By pulsing the voltage COLUMN RESET just before each pulsing of the row select voltage, the switch transistor pulls up the voltage at Node 6 to voltage Vcc just prior to reading of each cell. This technique also reduces noise in the data determined by circuit 21.

The operation of sampling (reading) each cell (e.g., cell 10) begins by briefly pulsing the gate of the cell's reset transistor N1 with a high level of reset voltage "RESET." This high level of the reset voltage (typically equal to Vcc, where Vcc is typically 5 volts) resets the voltage on photodiode d1 to an initial integration voltage to begin an image collection cycle.

Immediately after assertion of such pulse of the voltage signal "RESET," the initial integration voltage on photodiode d1 (the voltage at Node 3) is $V_{ini}$=VRESET−$V_{TN1}$−$V_{CLOCK}$, where $V_{TN1}$ is the threshold voltage of transistor N1, VRESET is the high level of the voltage signal "RESET," and $V_{CLOCK}$ represents reset noise from the pulsed reset voltage (assumed to be constant). Similarly, the initial integration voltage at Node 4 is VRESET−$V_{TN1}$−$V_{CLOCK}$−$V_{TN2}$, where $V_{TN2}$ is the threshold voltage of buffer transistor N2 (functioning as a source follower).

After the reset voltage has been pulsed and the voltage on photodiode d1 (the voltage at Node 3) has been reset, the gate of transistor N3 is pulsed with a high level of row select voltage signal "ROW SELECT." The high level of the row select voltage causes the voltage at Node 4, which represents the initial integration voltage of the cycle, to appear at Node 6. Detection and calculation circuit 21 then amplifies, digitizes, and stores the value of the initial integration voltage as it appears at Node 6.

Next, for a selected time period, photons are allowed to strike photodiode d1, thereby creating electron-hole pairs. Photodiode d1 is designed to limit recombination between the newly formed electron-hole pairs.

As a result, the photogenerated holes are attracted to the ground terminal of photodiode d1, while the photogenerated electrons are attracted to the positive terminal of photodiode d1, each additional electron reducing the voltage at Node 3. At the end of this image collection cycle, a final integration voltage will be present at Node 3. The final integration voltage is $V_f$=$V_{ini}$−$V_S$=VRESET−$V_{TN1}$−$V_{CLOCK}$−$V_S$, where $V_S$ represents the change in voltage (at Node 3) due to the absorbed photons. Similarly, the final integration voltage at Node 4 is VRESET−$V_{TN1}$−$V_{CLOCK}$−$V_{TN2}$−$V_S$.

At the end of the image collection cycle, the gate of transistor N3 is again pulsed with a high level of row select voltage signal "ROW SELECT" to cause the voltage at Node 4, which represents the final integration voltage of the cycle, to appear at Node 6. Detection and calculation circuit 21 amplifies and digitizes the value of the final integration voltage as it appears at Node 6, and generates data indicative of the number of photons that have been collected during the image collection cycle by calculating the difference ($V_S$) between the digitized final integration voltage taken at the end of the cycle and the digitized stored initial integration voltage taken at the start of the cycle.

After the final integration voltage has been latched by detection and calculation circuit 21, the reset voltage RESET is again pulsed to reset the voltage on photodiode d1 to begin another image collection cycle.

One of the problems with active pixel sensor cells (e.g., cell 10 of FIG. 1) is that during typical operation, the reset voltage RESET and the row select voltage ROW SELECT have high levels for periods (typically about 30 msec) which are sufficiently long to introduce a substantial amount of 1/f noise into the cell. Such 1/f noise, which results from trapping and detrapping of surface charges, can be accurately modeled as variations in the threshold voltages of transistors N1, N2, and N3. Due to such noise, the number of photons which are absorbed by photodiode d1 during an image collection cycle is more properly expressed as (VRESET−$V_{TN1}$−$V_{CLOCK}$−$V_{TN2}$)−(VRESET−$V_{TN1}$−$V_{CLOCK}$−$V_{TN2}$−$V_S$−$V_\alpha$), where $V_\alpha$ is a contribution due to variations in the threshold voltages of transistors N1, N2, and N3 due to 1/f noise. Thus, the variations in the threshold voltages of transistors N1, N2, and N3 add an error term $V_\alpha$ which erroneously yields $V_S$+$V_\alpha$ as the value determining the number of absorbed photons, thereby limiting the accuracy of the cell.

In some applications (as explained in U.S. patent application Ser. No. 08/707,933, filed on Sep. 10, 1996, naming Richard B. Merrill and Kevin E. Brehmer as inventors and assigned to the assignee of the present application), it is desirable to choose Vcc to be substantially less than VRESET (the high level of the reset voltage RESET). For example, Vcc may be chosen to be 3.3 volts and VRESET may be chosen to be 5 volts. This forces reset transistor N1 to operate in the linear region in which the high level of the reset voltage causes N1 to pull the voltage at Node 3 up to $V_{ini}$ in a manner subject to reduced variation due to changes in the threshold voltage of reset transistor N1 due to 1/f noise. However, this technique does not eliminate fixed pattern noise due to systematic and random variation among the characteristics of cells of an active pixel sensor cell array.

Active pixel sensor cell arrays that use a conventional source follower amplifier in each cell (e.g., arrays of the type described with reference to FIG. 1) are subject to fixed pattern noise due to systematic and random variation between cells. Such fixed pattern noise is due to many different sources of gain variation that cannot easily be corrected with post processing techniques such as correlated double sampling. It has been proposed to implement a better amplifier within each cell (which would be less subject to such gain variation from cell to cell) by including a CMOS amplifier within each cell. Such a CMOS amplifier includes at least one PMOS transistor as a current source load for high gain (in addition to one or more NMOS transistors). Unfortunately, it is not currently possible to integrate a PMOS transistor into a single cell (of an active pixel sensor cell array) without increasing the cell size to an acceptable degree.

Conventional CCD imagers are typically subject to significantly less fixed pattern noise than are active pixel sensor cell arrays that include a conventional source follower output amplifier in each cell. It would be desirable to implement an active pixel sensor cell array that is subject to no more fixed pattern noise than a conventional CCD imager, without unacceptably increasing the cell size of such active pixel sensor cell array.

SUMMARY OF THE INVENTION

In a class of embodiments, the invention is an active pixel sensor cell array in which a two-stage amplifier amplifies the output of each cell of the array. For each column of cells of the array, one part of the two-stage amplifier for each cell is shared by all cells of the column, and another part of the two-stage amplifier for each cell is included within the cell itself. Preferably, the output amplification circuitry within each cell includes only NMOS transistors and does not include any PMOS transistor. In preferred embodiments, a differential amplifier within each cell is the primary stage of the cell's output amplifier, and PMOS load circuitry including a secondary output amplifier stage is shared by all cells of the column. Preferably, a switchable bias circuit is provided to assert a bias voltage (to the gate of at least one transistor of the load circuitry) whose level depends on the state of a bias control signal. The bias voltage undergoes a transition which rapidly turns off each such transistor of the load circuitry (to reduce power consumption by the array) in response to a transition of the bias control signal from a first level to a second level, and the bias voltage undergoes a transition which causes each such transistor to conduct a desired bias current (needed to amplify fully the photodiode output of each cell to be read) in response to a transition of the bias control signal from the second level to the first level.

In preferred embodiments, the two-stage amplifier for each cell is an op amp, and the op amp for each cell comprises NMOS transistors (at least one of which is included in the cell itself) and at least one PMOS transistor, but no PMOS transistor is included within the cell itself. In some such preferred embodiments, at least one op amp is provided with capacitor feedback for increased gain.

Another aspect of the invention is an active pixel sensor cell including a differential amplifier (which asserts an amplified signal indicative of a sampled output voltage of the cell's photodiode) and load circuitry coupled to the cell. The load circuitry includes a secondary amplifier stage (which further amplifies the amplified signal produced within the cell and typically includes at least one PMOS transistor). Preferably, the differential amplifier includes no PMOS transistor. Also preferably, the differential amplifier is the first stage of an op amp, and the remainder of the op amp (including optional capacitor feedback circuitry) is included in the load circuitry. Thus, the remainder of the op amp is coupled to the cell but not included within the cell itself.

DETAILED DESCRIPTION OF THE PREFERRED EMBODIMENT

Figure 1:
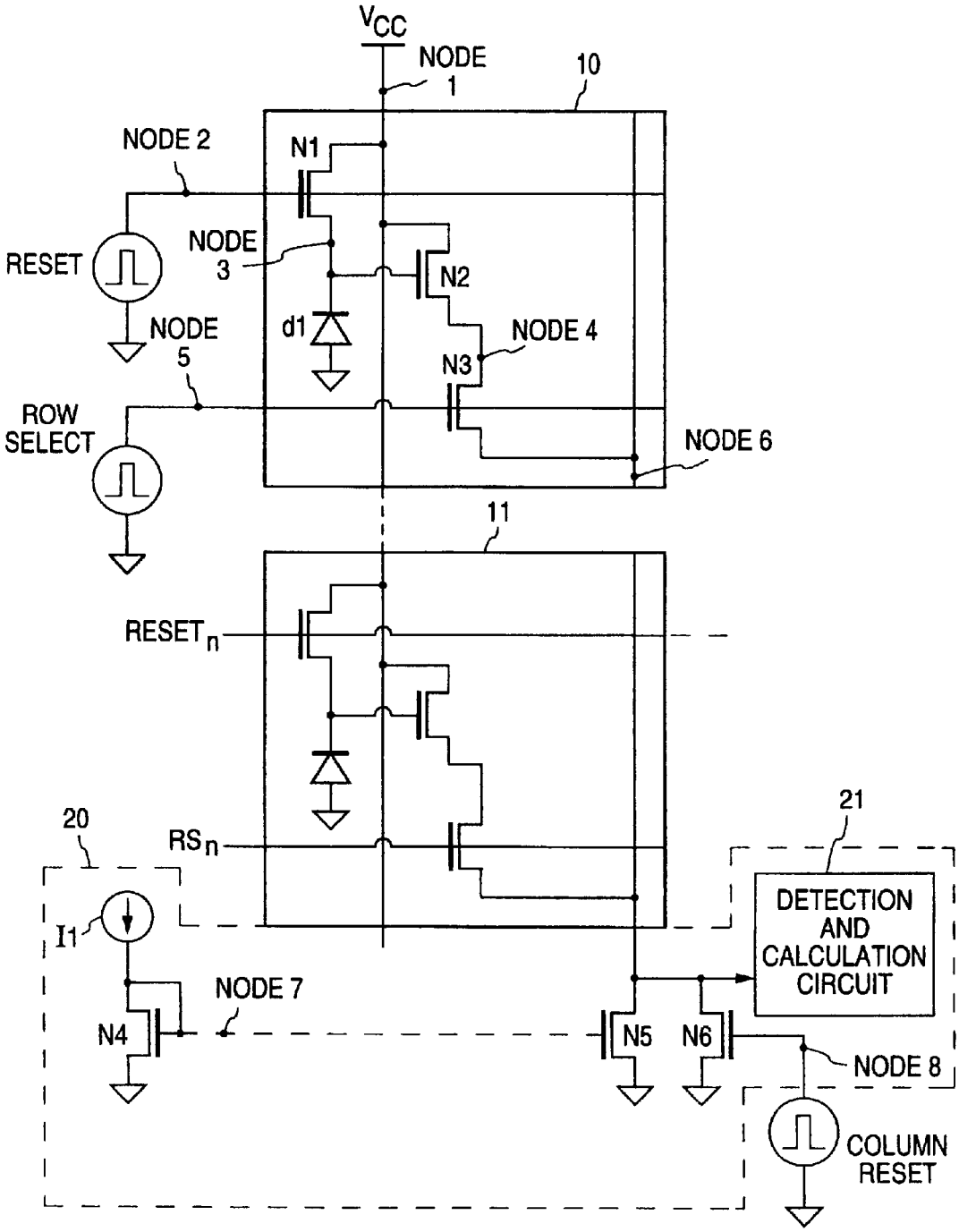
FIG. 1 (PRIOR ART)
FIG. 1 is a schematic diagram of two CMOS active pixel sensor cells (having conventional design) connected along a column of an active pixel sensor cell array, and circuitry for use in reading all cells connected along the column.
Figure 2:
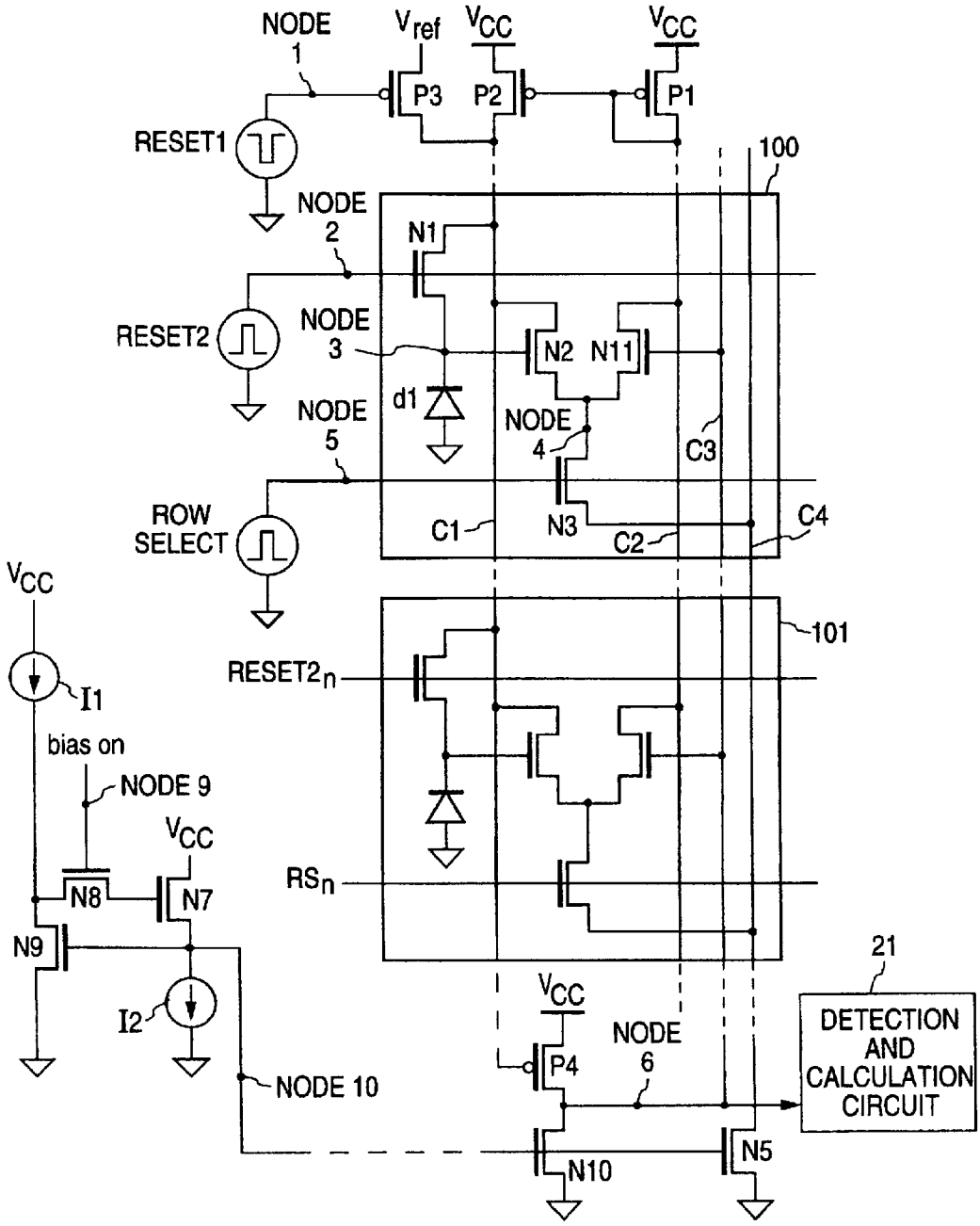
FIG. 2 is a schematic diagram of two CMOS active pixel sensor cells (which embody the invention) connected along a column of an active pixel sensor cell array, and circuitry which embodies the invention for use in reading all cells connected along the column.

FIG. 2 is a schematic diagram of a portion of an active pixel sensor array which embodies the present invention, including active pixel sensor cells 100 and 101 connected along a column of the array, and circuitry (comprising transistors P1, P2, P3, P4, N5, N7, N8, N9, and N10 and current sources I1 and I2) for use in reading cells 100, 101, and all other cells connected along the column. Cell 100 has several structural similarities to cell 10 of FIG. 1. Thus, the same reference numerals are used in FIGS. 1 and 2 to designate the structures which are common to both cells. In FIG. 2, transistors P1, P2, P3, and P4 are PMOS transistors, and transistors N7, N8, N9, N10, and N11 are NMOS transistors.

With reference to FIG. 2, the column along which cells 100 and 101 are connected has four column lines: line C1 (to which the drains of N1 and N2 and the channel of P2 are coupled); line C2 (to which the drain of N11 and the channel of P1 are coupled); line C3 (to which the gate of N11, the source of P4, and circuit 21 are coupled); and line C4 (to which the source of N3 and the drain of N5 are coupled). In contrast, in the FIG. 1 array, the column along which cells 10 and 11 are connected has only two column lines (one to which the drain of N1 is coupled and another to which circuit 21 is coupled). In an integrated circuit implementation, the two extra wires needed to fabricate the two extra column lines of the FIG. 2 array can be accommodated with a minimal amount of extra space if three-layer metal is used (so that the two extra wires can be implemented as a third metal layer overlaying either of the other two meal layers).

The dashed portions of lines C1–C4 indicate that additional cells (identical to cells 100 and 101) will typically also be connected along the array column including cells 100 and 101. Of course, it is contemplated that the array includes many additional columns (not shown). Thus, the signals ROW SELECT and RESET2 are provided simultaneously to all the cells connected along the same row as is cell 100 (i.e., to one cell in each column of the array). Similarly, the signals ROW SELECT$_n$ and RESET2$_n$ (which have the same function as signals ROW SELECT and RESET2, respectively, but are asserted independently from signals ROW SELECT and RESET2) are provided simultaneously to all the cells connected along the same row as is cell 101 (i.e., to one cell in each column of the array). If a separate detection and calculation circuit 21 is provided for each column, one cell from each column can be simultaneously read.

In operation, the voltage (RESET1) at the gate of PMOS transistor P3 (Node 1) is pulsed low before each read of a cell (e.g., during a sequential read of all cells connected along the column, Node 1 is pulsed low, then cell 100 is read, then Node 1 is again pulsed low, and then cell 101 is read). In cell 100, the step of applying a low voltage pulse to Node 1 resets column line C1 to reference voltage Vref (Vref is typically 3 volts) in order to reduce variation (due to noise) in the voltage at Node 3 during subsequent resetting of photodiode d1.

Optionally also, a column reset pulse is asserted to the gate of a column reset transistor whose channel is connected to Node 6, in order to reset Node 6 to a known voltage before each read of a cell by circuit 21 (as described in the above-referenced U.S. patent application entitled "Active Pixel Sensor Cell that Reduces Noise in the Photo Information Extracted from the Cell," filed on Jun. 9, 1997).

After column line C1, and optionally also column line C3 (and thus Node 6), have been reset, a read of a cell is performed. For specificity, the following description of such a read is with reference to cell 100, although it applies (with obvious modifications) to a read of any cell of the array.

Initially, the gate (Node 2) of cell 100's reset transistor N1 is briefly pulsed with a high level of reset voltage "RESET2." This high level of the reset voltage (typically equal to 5 volts) resets the voltage on photodiode d1 to an initial integration voltage to begin an image collection cycle.

Immediately, after assertion of such pulse of reset voltage "RESET2," the initial integration voltage on photodiode d1 (the voltage at Node 3) is $V_{ini}$=VRESET−$V_{TN1}$−$V_{CLOCK}$, where $V_{TN1}$ is the threshold voltage of transistor N1, VRESET is the high level of the voltage signal "RESET2," and $V_{CLOCK}$ represents reset noise from the pulsed reset voltage (assumed to be constant).

After the reset voltage has been pulsed and the voltage on photodiode d1 (the voltage at Node 3) has been reset, the gate of transistor N3 (Node 5) is pulsed with a high level of row select voltage signal "ROW SELECT." In accordance with the invention, each sampled photodiode voltage (at Node 3) is amplified by a two-stage amplifier to produce an output voltage (at Node 6) which is detected and processed by detection and calculation circuit 21. Specifically, circuit 21 amplifies, digitizes, and stores the value of the amplified initial integration voltage at Node 6, then amplifies and digitizes the value of the amplified final integration voltage at Node 6, and subtracts the former digital value from the latter digital value to generate data indicative of the number of photons incident at photodiode d1 during the image collection cycle (between the two pulses of the "ROW SELECT" voltage). The difference value ($V_S$) indicative of the difference between the digitized final integration voltage and the digitized initial integration voltage preferably undergoes correlated double sampling ("CDS") or other conventional post-processing in circuit 21.

The first stage (sometimes referred to herein as the "primary" stage) of the two-stage amplifier comprises NMOS transistors N2 and N11 (connected as shown with their sources at Node 4, the drain of N2 coupled to column line C1, and the drain of N11 connected to column line C2 and thus to the common gate and drain of P1) which form a differential amplifier whose tail current flows to ground through NMOS transistors N3 and N5, and PMOS transistors P1 and P2 (connected as shown with their gates connected together and their sources held at supply voltage Vcc). Transistors P1 and P2 form matched loads for the differential pair N2, N11. Supply voltage Vcc is typically 5 volts.

The output of the first stage (the voltage at the drain of N2) is asserted via column line C1 to the gate of PMOS transistor P4. This output is further amplified in the second gain stage (sometimes referred to herein as the "secondary" stage) which consists of PMOS transistor P4 and NMOS transistor N10 connected as shown (with supply voltage Vcc applied to the source of transistor P4, the drain of P4 connected to the drain of N10, and the source of N10 connected to ground). The common drain of transistors P4 and N10 (Node 6) is the output of the secondary stage.

As in the FIG. 1 circuit, the gate of transistor N3 (Node 5) is twice pulsed with a high level of row select voltage "ROW SELECT" to read a cell (a first time to assert an initial integration voltage at Node 6, and a second time to assert a final integration voltage at Node 6). Each time the gate of transistor N3 (Node 5) is pulsed with a high level of row select voltage "ROW SELECT" (assuming transistors N10 and N5 are "on" in response to a low voltage at Node 10 and transistor P3 is off in response to a high voltage at Node 1), a partially amplified voltage indicative of the Node 3 voltage (the initial or final integration voltage on photodiode d1) appears on column line C1 and a fully amplified voltage (also indicative of the Node 3 voltage) appears at Node 6 (on column line C3).

Between the assertion of the two pulses of the high level of voltage ROW SELECT at the gate of transistor N3 (Node 5), photons are allowed to strike photodiode d1, thereby creating electron-hole pairs. The photogenerated holes are attracted to the ground terminal of photodiode d1, and the photogenerated electrons are attracted to the positive terminal of photodiode d1, each additional electron reducing the voltage at Node 3. At the end of this image collection period, the following final integration voltage will be present at Node 3: $V_f = V_{ini} - V_S = VRESET - V_{TN1} - V_{CLOCK} - V_S$, where $V_S$ represents the change in voltage (at Node 3) due to the absorbed photons.

After a read operation is performed on cell 100, another cell (e.g., cell 101) can be read in essentially the same manner: the cell's first column line (e.g., line C1, for each cell connected along the column that includes cells 100 and 101) is initially reset to reference voltage Vref (optionally also the cell's output column line, e.g., line C3 for each cell connected along the column that includes cells 100 and 101, is reset), then the cell's photodiode is reset, and then two pulses of the high level of voltage ROW SELECT are asserted sequentially to the cell to cause two pulses of tail current to flow from the cell's differential pair to ground. In response to the two pulses of voltage ROW SELECT, detection and calculation circuit 21 generates data indicative of the number of photons incident at the cell's photodiode during the image collection period (the time period between the two pulses of the voltage ROW SELECT).

The described two-stage amplifier (whose primary stage is the differential amplifier comprised of P1, P2, N2, N3, N11 and N5, and whose secondary stage comprises P4 and N10) can be implemented using conventional CMOS fabrication techniques to have a gain of 10,000 or more. Such a large gain effectively reduces typical error due to pixel gain to 0.01% or less, in the following sense. When many cells are read sequentially after each is exposed to identical incident light energy, the error in the output voltage at Node 6 due to systematic and random variation among the characteristics of the cells is not more than 0.01% of the average output voltage at Node 6 (averaged over all cells).

In accordance with the invention, a first part of the two-stage amplifier for each cell is implemented within the cell itself (e.g., elements N1, N2, N3 and N11 within cell 100) and another part of the two-stage amplifier is implemented outside the cell (e.g., elements P1, P2, P4, N5 and N10). The latter portion of the two-stage amplifier is shared by all the cells connected along a single column of an array.

Still with reference to FIG. 2, the function of the circuit comprising elements N8, N9, N7, I1, and I2 is to turn off transistors N5 and N10 rapidly when desired and to bias them when desired to sink current from their drains. It is desirable to conserve power by turning transistors N5 and N10 off rapidly at times when it is not necessary to sink current through them. The channel of NMOS transistor N7 is connected between supply voltage Vcc and Node 10, and current sink I2 is connected between Node 10 and ground. The gate of N7 is connected to one channel terminal of NMOS transistor N8, and the other channel terminal of transistor N8 is connected to the drain of NMOS transistor N9. The source of transistor N9 is connected to ground and the gate of transistor N9 is connected to Node 10. Current source I1 is connected between supply voltage Vcc and the drain of transistor N9.

The level of the voltage "bias on" asserted to the gate of transistor N8 controls the state of transistors N5 and N6 as follows. When "bias on" switches from a low level (e.g., ground potential) to a high level (e.g., 5 volts), elements I1, N9, N8, and N7 function (with transistors N10 and N5) as a current mirror to cause Node 10 to rise rapidly to a level which biases transistors N5 and N10 to sink a level of current appropriate for reading a cell (a cell connected along the column comprising cells 100 and 101). When "bias on" switches from a high level (e.g., 5 volts) to a low level (e.g., ground potential) voltage, Node 10 is rapidly pulled down to ground potential, thereby rapidly turning off transistors N5 and N10.

Optionally, elements I1, I2, N7, N8, and N9 of the FIG. 2 embodiment (and variations thereon) are replaced by conventional bias circuitry such as the circuit comprising current source I1 and transistor N4 of FIG. 1.

Figure 3:
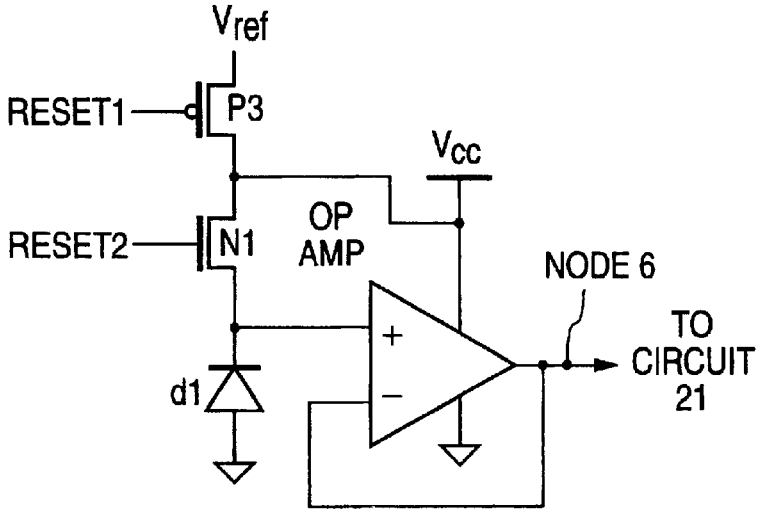
FIG. 3 is a simplified schematic diagram of a variation on the FIG. 2 circuit, with only one cell connected along the column.

FIG. 3 is a simplified schematic diagram of a variation on the FIG. 2 circuit, with only one cell connected along the column. The FIG. 3 circuit is identical to that shown in FIG. 2 except that the column includes only one cell (cell 100). In FIG. 3, the op amp is implemented by elements P1, P2, N2, N3, N11, P4, N5, N7, N8, N9, I1, I2, and N5 of FIG. 2 (connected as shown in FIG. 2).

Figure 4:
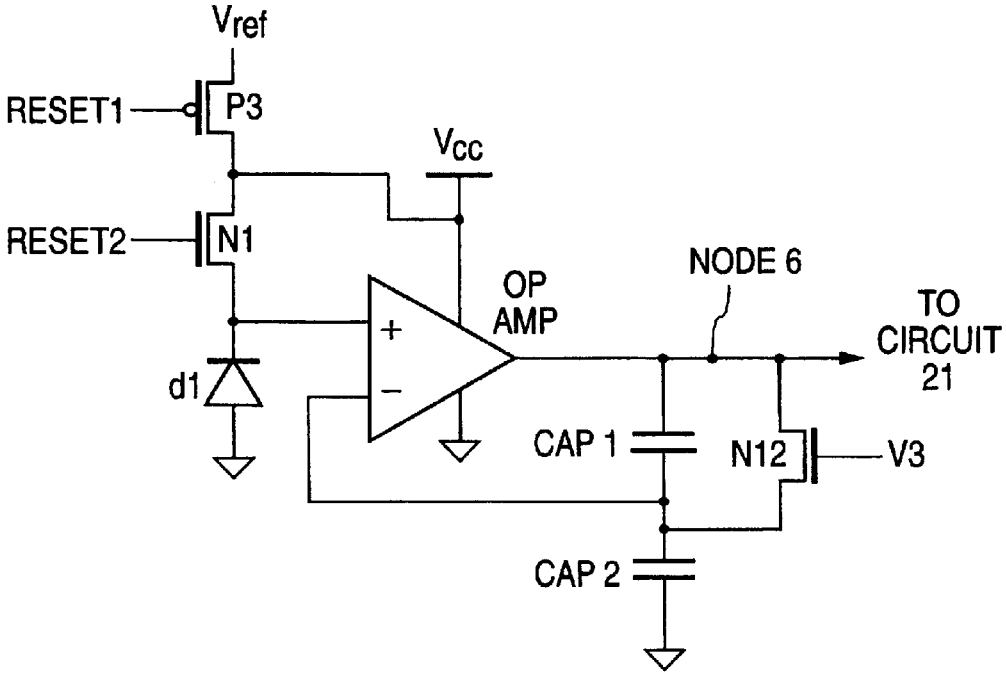
FIG. 4 is a schematic diagram of an alternative embodiment of the invention which is a variation on the FIG. 3 embodiment.

FIG. 4 is a variation on the FIG. 3 embodiment, which includes capacitor feedback circuitry (capacitors CAP1 and CAP2, and NMOS transistor N12) for increasing the gain of the op amp. The other components of the FIG. 4 circuit are identical to the corresponding, identically identified components of the FIG. 3 circuit and the above description of them with reference to FIGS. 2 and 3 will not be repeated with reference to FIG. 4. In the FIG. 4 circuit, capacitor CAP1 is connected between output node 6 and the gate of transistor N3 (shown in FIG. 2) of the op amp, and capacitor CAP2 is connected between the gate of transistor N3 and ground. As shown in FIG. 4, capacitors CAP1 and CAP2 provide an additional gain of [(CAP1+CAP2)/CAP1] to the output of the cell.

In FIG. 4, the channel of transistor N12 and capacitor CAP1 are connected in parallel between output node 6 and the gate of transistor N3 of the op amp. The gate of transistor N12 receives control voltage V3, whose level is varied to switch transistor N12 off and on at desired times during operation.

It should be understood that it will typically be desirable to implement any of the embodiments of the inventive cell array so that different gain is provided from cell to cell by the "in-cell" portions of the two-stage amplifiers (the amplifier portion within each cell of the array). For example, the FIG. 2 embodiment can be implemented with the characteristics of transistors N2, N3, and N11 within cell 100 being different from the characteristics of the corresponding transistors within cell 101, so that different "primary stage" gain provided at the gate of transistor P4 when reading cell 100 than is provided at the gate of transistor P4 when reading cell 101. This may be desirable for example, when the output of cell 100 indicates intensity of blue light incident at cell 100's photodiode and the output of cell 101 indicates intensity of red light incident at cell lolls photodiode (since a photodiode will typically have different response to red light than to blue light, and thus it is desirable to compensate for such different response by the amount of "primary stage" gain provided in the cell).

It should be understood that various alternatives to the embodiment of the invention described herein may be employed in practicing the invention. For example, the concepts of the present invention can readily be applied to a row of cells in an array of cells. With an array of cells, a latch/column sense amplifier and a current mirror are utilized with each column of cells.

Thus, it is intended that the following claims define the scope of the invention and that structures within the scope of these claims and their equivalents be covered thereby.

What is claimed is:

1. An active pixel sensor cell array including at least a first cell and a second cell connected along a column, where the first cell is an active pixel sensor cell including a first photodiode and a reset circuit configured to reset the first photodiode in response to a reset signal, and the second cell is an active pixel sensor cell including a second photodiode and a second reset circuit configured to reset the second photodiode in response to a second reset signal, said array comprising:

a primary amplifier stage within the first cell, coupled to the first photodiode and configured to output a first amplified signal indicative of a sampled output voltage of said first photodiode;

a second primary amplifier stage within the second cell, coupled to the second photodiode and configured to output a second amplified signal indicative of a sampled output voltage of said second photodiode, wherein each of the primary amplifier stage and the second primary amplifier stage is a differential amplifier; and load circuitry, physically separate from the first cell and the second cell but coupled to both the primary amplifier stage and the second primary amplifier stage, including a secondary output amplifier stage configured to output a further amplified signal in response to any selected one of the first amplified signal and the second amplified signal, wherein the primary amplifier stage and the load circuitry together comprise an op amp, and the op amp has an output terminal at which the further amplified signal is output, wherein the primary amplifier stage has a first input coupled to the first photodiode and a second input to which the output terminal of the op amp is coupled, and wherein the array is operable in a mode in which the further amplified signal is output at the output terminal of the op amp and is fed back to the second input of the primary amplifier stage.

2. An active pixel sensor cell array including at least a first cell and a second cell connected along a column, where the first cell is an active pixel sensor cell including a first photodiode and a reset circuit configured to reset the first photodiode in response to a reset signal, and the second cell is an active pixel sensor cell including a second photodiode and a second reset circuit configured to reset the second photodiode in response to a second reset signal, said array comprising:

a primary amplifier stage within the first cell, coupled to the first photodiode and configured to output a first amplified signal indicative of a sampled output voltage of said first photodiode;

a second primary amplifier stage within the second cell, coupled to the second photodiode and configured to output a second amplified signal indicative of a sampled output voltage of said second photodiode, wherein each of the primary amplifier stage and the second primary amplifier stage is a differential amplifier; and load circuitry, physically separate from the first cell and the second cell but coupled to both the primary amplifier stage and the second primary amplifier stage, including a secondary output amplifier stage configured to output a further amplified signal in response to any selected one of the first amplified signal and the second amplified signal, wherein the primary amplifier stage and the load circuitry together comprise an op amp, and the op amp has an output terminal at which the further amplified signal is output, wherein the primary amplifier stage has a first input coupled to the first photodiode and a second input, and the array also includes:

a capacitor feedback circuit having an output coupled to the second input of the primary amplifier stage, and an input coupled to the output terminal of the op amp.

3. An active pixel sensor cell array including at least a first cell and a second cell connected along a column, where the first cell is an active pixel sensor cell including a first photodiode and a reset circuit configured to reset the first photodiode in response to a reset signal, and the second cell is an active pixel sensor cell including a second photodiode and a second reset circuit configured to reset the second photodiode in response to a second reset signal, said array comprising:

a primary amplifier stage within the first cell, coupled to the first photodiode and configured to output a first amplified signal indicative of a sampled output voltage of said first photodiode;

a second primary amplifier stage within the second cell, coupled to the second photodiode and configured to output a second amplified signal indicative of a sampled output voltage of said second photodiode, wherein each of the primary amplifier stage and the second primary amplifier stage is a differential amplifier; and load circuitry, physically separate from the first cell and the second cell but coupled to both the primary amplifier stage and the second primary amplifier stage, including a secondary output amplifier stage configured to output a further amplified signal in response to any selected one of the first amplified signal and the second amplified signal, wherein each of the primary amplifier stage and the second primary amplifier stage includes NMOS transistors but no PMOS transistor, wherein the column includes a first column line, a second column line, a third column line, and a fourth column line, and wherein the load circuitry includes:

a first PMOS transistor having a source for coupling to a supply voltage, a drain coupled to a first end of the first column line, and a gate;

a second PMOS transistor having a source for coupling to the supply voltage, a drain coupled to a first end of the second column line, and a gate coupled to the gate of the first PMOS transistor and to the drain of the second PMOS transistor;

a third PMOS transistor having a gate coupled to a second end of the first column line, a source for coupling to the supply voltage, and a drain at which the further amplifier signal is output;

a first NMOS transistor having a drain coupled to the drain of the third PMOS transistor, a source for coupling to ground potential, and a gate; and bias circuitry coupled to the gate of the first NMOS transistor and configured to output a bias voltage to said gate of the first NMOS transistor.

4. The array of claim 3, wherein the reset circuit of the first cell and the second reset circuit of the second cell are coupled to the first column line, the primary amplifier stage has a first input coupled to the first photodiode, a second input coupled to the third column line, and a tail current circuit coupled to the fourth column line and configured to sink a first tail current to said fourth column line in response to a row select signal, the second primary amplifier stage has a first input coupled to the second photodiode, a second input coupled to the third column line, and a second tail current circuit coupled to the fourth column line and configured to sink a second tail current to said fourth column line to response to another row select signal, and wherein the load circuitry also includes:

a second NMOS transistor having a drain coupled to the fourth column line, a source for coupling to the ground potential, and a gate coupled to the bias circuitry.

5. An active pixel sensor cell array including at least a first cell and a second cell connected along a column, where the first cell is an active pixel sensor cell including a first photodiode and a reset circuit configured to reset the first photodiode in response to a reset signal, and the second cell is an active pixel sensor cell including a second photodiode and a second reset circuit configured to reset the second photodiode in response to a second reset signal, said array comprising:

a primary amplifier stage within the first cell, coupled to the first photodiode and configured to output a first amplified signal indicative of a sampled output voltage of said first photodiode;

a second primary amplifier stage within the second cell, coupled to the second photodiode and configured to output a second amplified signal indicative of a sampled output voltage of said second photodiode, wherein each of the primary amplifier stage and the second primary amplifier stage is a differential amplifier; and load circuitry, physically separate from the first cell and the second cell but coupled to both the primary amplifier stage and the second primary amplifier stage, including a secondary output amplifier stage configured to output a further amplified signal in response to any selected one of the first amplified signal and the second amplified signal, wherein the column includes at least a first column line, and the load circuitry includes:

a PMOS transistor having a gate coupled to an end of the first column line, a source for coupling to a supply voltage, and a drain at which the further amplified signal is output;

a first NMOS transistor having a drain coupled to the drain of the PMOS transistor, a source for coupling to ground potential, and a gate; and a bias circuit coupled to the gate of the first NMOS transistor and configured to output a bias voltage to the gate of the first NMOS transistor in response to a bias control signal, wherein the bias voltage undergoes a first transition which rapidly turns off the first NMOS transistor in response to transition of the bias control signal from a first level to a second level, and the bias voltage undergoes a second transition causing the first NMOS transistor to conduct a desired bias current in response to transition of the bias control signal from the second level to the first level.

6. The array of claim 5, wherein the column also includes a second column line, a third column line, and a fourth column line, the reset circuit of the first cell and the second reset circuit of the second cell are coupled to the first column line, the primary amplifier stage has a first input coupled to the first photodiode, a second input coupled to the third column line, and a tail current circuit coupled to the fourth column line and configured to sink a first tail current to said fourth column line in response to a row select signal, the second primary amplifier stage has a first input coupled to the second photodiode, a second input coupled to the third column line, and a second tail current circuit coupled to the fourth column line and configured to sink a second tail current to said fourth column line in response to another row select signal, and wherein the load circuitry includes:

a second PMOS transistor having a source for coupling to the supply voltage, a drain coupled to another end of the first column line, and a gate;

a third PMOS transistor having a source for coupling to the supply voltage, a drain coupled to a first end of the second column line, and a gate coupled to the gate of the second PMOS transistor and to the drain of the third PMOS transistor; and a second NMOS transistor having a drain coupled to the fourth column line, a source for coupling to ground potential, and a gate coupled to the bias circuitry to receive said bias voltage from the bias circuitry.

7. An active pixel sensor cell array including at least a first cell and a second cell connected along a column including at least a first column line, where the first cell is an active pixel sensor cell including a first photodiode and a reset circuit configured to reset the first photodiode in response to a reset signal, and the second cell is an active pixel sensor cell including a second photodiode and a second reset circuit configured to reset the second photodiode in response to a second reset signal, said array comprising:

a primary amplifier stage within the first cell, coupled to the first photodiode and configured to output a first amplified signal indicative of a sampled output voltage of said first photodiode;

a second primary amplifier stage within the second cell, coupled to the second photodiode and configured to output a second amplified signal indicative of a sampled output voltage of said second photodiode; and load circuitry, physically separate from the first cell and the second cell but coupled to both the primary amplifier stage and the second primary amplifier stage, including a secondary output amplifier stage configured to output a further amplified signal in response to any selected one of the first amplified signal and the second amplified signal, wherein the load circuitry includes:

a PMOS transistor having a gate coupled to an end of the first column line, a source for coupling to a supply voltage, and a drain at which the further amplified signal is output;

a first NMOS transistor having a drain coupled to the drain of the PMOS transistor, a source for coupling to ground potential, and a gate; and a bias circuit coupled to the gate of the first NMOS transistor and configured to output a bias voltage to the gate of the first NMOS transistor in response to a bias control signal, wherein the bias voltage undergoes a first transition which rapidly turns off the first NMOS transistor in response to transition of the bias control signal from a first level to a second level, and the bias voltage undergoes a second transition causing the first NMOS transistor to conduct a desired bias current in response to transition of the bias control signal from the second level to the first level.

8. The array of claim 7, wherein the column also includes a second column line, a third column line, and a fourth column line, the primary amplifier stage is a first differential amplifier, the second primary amplifier stage is a second differential amplifier, the reset circuit of the first cell and the second reset circuit of the second cell are coupled to the first column line, the first differential amplifier has a first input coupled to the first photodiode, a second input coupled to the third column line, and a tail current circuit coupled to the fourth column line and configured to sink a first tail current to said fourth column line in response to a row select signal, the second differential amplifier has a first input coupled to the second photodiode, a second input coupled to the third column line, and a second tail current circuit coupled to the fourth column line and configured to sink a second tail current to said fourth column line in response to another row select signal, and wherein the load circuitry includes:

a second PMOS transistor having a source for coupling to the supply voltage, a drain coupled to another end of the first column line, and a gate;

a third PMOS transistor having a source for coupling to the supply voltage, a drain coupled to a first end of the second column line, and a gate coupled to the gate of the second PMOS transistor and to the drain of the third PMOS transistor; and a second NMOS transistor having a drain coupled to the fourth column line, a source for coupling to ground potential, and a gate coupled to the bias circuitry to receive said bias voltage from the bias circuitry.

9. The array of claim 7, wherein the primary amplifier stage is a first differential amplifier, the second primary amplifier stage is a second differential amplifier, the first differential amplifier and the load circuitry together comprise an op amp, and the op amp has an output terminal at which the further amplified signal is output.

10. The array of claim 9, wherein the first differential amplifier has a first input coupled to the first photodiode and a second input to which the output terminal of the op amp is coupled, and wherein the array is operable in a mode in which the further amplified signal is output at the output terminal of the op amp and is fed back to the second input of the first differential amplifier.

11. An active pixel sensor cell circuit, including an active pixel sensor cell including a photodiode, a reset circuit coupled to the photodiode and configured to reset the first photodiode in response to a reset signal, and a differential amplifier coupled to the photodiode and configured to output an amplified signal indicative of a sampled output voltage of said photodiode in response to a control signal; and load circuitry physically separate from the active pixel sensor cell, wherein the load circuitry is coupled to the differential amplifier for receiving the amplified signal amplifier stage, and the load circuitry includes a secondary output amplifier stage configured to output a further amplified signal in response to the amplified signal, wherein the differential amplifier and the secondary output amplifier stage together comprise an op amp, and the op amp has an output terminal at which the further amplified signal is output, wherein the differential amplifier has a first input coupled to the photodiode and a second input to which the output terminal of the op amp is coupled, and wherein the circuit is operable in a mode in which the further amplified signal is output at the output terminal of the op amp and is fed back to the second input of the differential amplifier.

12. An active pixel sensor cell circuit, including:

an active pixel sensor cell including a photodiode, a reset circuit coupled to the photodiode and configured to reset the first photodiode in response to a reset signal, and a differential amplifier coupled to the photodiode and configured to output an amplified signal indicative of a sampled output voltage of said photodiode in response to a control signal; and load circuitry physically separate from the active pixel sensor cell, wherein the load circuitry is coupled to the differential amplifier for receiving the amplified signal amplifier stage, and the load circuitry includes a secondary output amplifier stage configured to output a further amplified signal in response to the amplified signal, wherein the differential amplifier and the secondary output amplifier stage together comprise an op amp, and the op amp has an output terminal at which the further amplified signal is output, wherein the differential amplifier has a first input coupled to the photodiode and a second input, and wherein said active pixel sensor cell circuit also includes:

a capacitor feedback circuit having an output coupled to the second input of the differential amplifier, and an input coupled to the output terminal of the op amp.

13. An active pixel sensor cell circuit, including:

an active pixel sensor cell including a photodiode, a reset circuit coupled to the photodiode and configured to reset the first photodiode in response to a reset signal, and a differential amplifier coupled to the photodiode and configured to output an amplified signal indicative of a sampled output voltage of said photodiode in response to a control signal;

load circuitry physically separate from the active pixel sensor cell, wherein the load circuitry is coupled to the differential amplifier for receiving the amplified signal amplifier stage, and the load circuitry includes a secondary output amplifier stage configured to output a further amplified signal in response to the amplified signal; and a first column line extending through the cell, a second column line extending through the cell, a third column line extending through the cell, and a fourth column line extending through the cell, wherein the reset circuit is coupled to the first column line, wherein the differential amplifier has a first input coupled to the photodiode, a second input coupled to the third column line, and a tail current circuit coupled to the fourth column line and configured to sink a first tail current to said fourth column line in response to a row select signal, and wherein the load circuitry includes:

a first PMOS transistor having a source for coupling to a supply voltage, a drain coupled to a first end of the first column line, and a gate;

a second PMOS transistor having a source for coupling to the supply voltage, a drain coupled to a first end of the second column line, and a gate coupled to the gate of the first PMOS transistor and to the drain of the second PMOS transistor;

a third PMOS transistor having a gate coupled to a second end of the first column line, a source for coupling to the supply voltage, and a drain at which the further amplified signal is output;

a first NMOS transistor having a drain coupled to the drain of the third PMOS transistor, a source for coupling to ground potential, and a gate; and bias circuitry coupled to the gate of the first NMOS transistor and configured to output a bias voltage to said gate of the first NMOS transistor.

14. The active pixel sensor cell circuit of claim 13, wherein the load circuitry also includes:

a second NMOS transistor having a drain coupled to the fourth column line, a source for coupling to the ground potential, and a gate coupled to the bias circuitry for receiving the bias voltage from said bias circuitry.

*15. An active pixel sensor cell array including at least a first cell and a second cell connected along a column, where the first cell is an active pixel sensor cell including a first photodiode and a reset circuit configured to reset the first photodiode in response to a reset signal, and the second cell is an active pixel sensor cell including a second photodiode and a second reset circuit configured to reset the second photodiode in response to a second reset signal, said array comprising:*

*a primary amplifier stage within the first cell, coupled to the first photodiode and configured to output a first amplified signal indicative of a sampled output voltage of said first photodiode;*

*a second primary amplifier stage within the second cell, coupled to the second photodiode and configured to output a second amplified signal indicative of a sampled output voltage of said second photodiode, wherein each of the primary amplifier stage and the second primary amplifier stage is a differential amplifier; and*

*load circuitry, physically separate from the first cell and the second cell but coupled to both the primary amplifier stage and the second primary amplifier stage, including a secondary output amplifier stage configured to output a further amplified signal in response to any selected one of the first amplified signal and the second amplified signal, wherein the primary amplifier stage has a first input coupled to the first photodiode and a second input, and wherein the array is operable in a mode in which the further amplified signal is output and is fed back to the second input of the primary amplifier stage.*

*16. An active pixel sensor cell array including at least a first cell and a second cell connected along a column, where the first cell is an active pixel sensor cell including a first photodiode and a reset circuit configured to reset the first photodiode in response to a reset signal, and the second cell is an active pixel sensor cell including a second photodiode and a second reset circuit configured to reset the second photodiode in response to a second reset signal, said array comprising:*

*a primary amplifier stage within the first cell, coupled to the first photodiode and configured to output a first amplified signal indicative of a sampled output voltage of said first photodiode;*

*a second primary amplifier stage within the second cell, coupled to the second photodiode and configured to output a second amplified signal indicative of a sampled output voltage of said second photodiode, wherein each of the primary amplifier stage and the second primary amplifier stage is a differential amplifier; and*

*load circuitry, physically separate from the first cell and the second cell but coupled to both the primary amplifier stage and the second primary amplifier stage, including a secondary output amplifier stage configured to output a further amplified signal in response to any selected one of the first amplified signal and the second amplified signal, wherein the primary amplifier stage has a first input coupled to the first photodiode and a second input, and the array also includes:*

*a capacitor feedback circuit having an output coupled to the second input of the primary amplifier stage, and an input coupled to further amplified signal.*

*17. The array of claim 7, wherein the column also includes a second column line, a third column line, and a fourth column line, the primary amplifier stage is a first differential amplifier, the second primary amplifier stage is a second differential amplifier, the reset circuit of the first cell and the second reset circuit of the second cell are coupled to the first column line, the first differential amplifier has a first input coupled to the first photodiode, a second input coupled to the third column line, and a tail current circuit coupled to the fourth column line and configured to sink a first tail current to said fourth column line in response to a row select signal, the second differential amplifier has a first input coupled to the second photodiode, a second*

*input coupled to the third column line, and a second tail current circuit coupled to the fourth column line and configured to sink a second tail current to said fourth column line in response to another row select signal, and wherein the load circuitry includes:*

*a second PMOS transistor having a source for coupling to the supply voltage, a drain coupled to another end of the first column line, and a gate;*

*a third PMOS transistor having a source for coupling to the supply voltage, a drain coupled to a first end of the second column line, and a gate coupled to the gate of the second PMOS transistor and to the drain of the third PMOS transistor; and*

*a second NMOS transistor having a drain coupled to the fourth column line, a source for coupling to ground potential, and a gate coupled to the bias circuitry to receive said bias voltage from the bias circuitry.*

*18. The array of claim 7, wherein the primary amplifier stage is a first differential amplifier, the second primary amplifier stage is a second differential amplifier.*

*19. The array of claim 18, wherein the first differential amplifier has a first input coupled to the first photodiode and a second input, and wherein the array is operable in a mode in which the further amplified signal is output and is fed back to the second input of the first differential amplifier.*

*20. An active pixel sensor cell circuit, including*

*an active pixel sensor cell including a photodiode, a reset circuit coupled to the photodiode and configured to reset the first photodiode in response to a reset signal, and a differential amplifier coupled to the photodiode and configured to output an amplified signal indicative of a sampled output voltage of said photodiode in response to a control signal; and*

*load circuitry physically separate from the active pixel sensor cell, wherein the load circuitry is coupled to the differential amplifier for receiving the amplified signal amplifier stage, and the load circuitry includes a secondary output amplifier stage configured to output a further amplified signal in response to the amplified signal, wherein the differential amplifier has a first input coupled to the photodiode and a second input, and wherein the circuit is operable in a mode in which the further amplified signal is output and is fed back to the second input of the differential amplifier.*

*21. An active pixel sensor cell circuit, including:*

*an active pixel sensor cell including a photodiode, a reset circuit coupled to the photodiode and configured to reset the first photodiode in response to a reset signal, and a differential amplifier coupled to the photodiode and configured to output an amplified signal indicative of a sampled output voltage of said photodiode in response to a control signal; and*

*load circuitry physically separate from the active pixel sensor cell, wherein the load circuitry is coupled to the differential amplifier for receiving the amplified signal amplifier stage, and the load circuitry includes a secondary output amplifier stage configured to output a further amplified signal in response to the amplified signal, wherein the differential amplifier has a first input coupled to the photodiode and a second input, and wherein said active pixel sensor cell circuit also includes:*

*a capacitor feedback circuit having an output coupled to the second input of the differential amplifier, and an input coupled to the further amplified signal.*

*22. A pixel sensor, comprising:*

*a photodetector; and*

*a differential pair of transistors having a first input coupled to said photodetector, a second input coupled to an input column line, a first differential output coupled to a first output column line, and a second differential output coupled to a second output column line.*

*23. The pixel sensor of claim 22, further comprising a switch configured to activate said differential pair, said switch coupled to a row line.*

*24. A pixel sensor, comprising:*

*a photodetector; and*

*an amplifier having an input coupled to said photodetector, a first complementary output coupled to a first output column line, and a second complementary output coupled to a second output column line.*

*25. The pixel sensor of claim 24, further comprising a switch configured to activate said amplifier, said switch coupled to a row line.*

* * * * *